April 14, 1970    I. V. K. HOTT ET AL    3,506,080
ELECTRICALLY OPERATED SCOOTER VEHICLE
Filed Dec. 21, 1967
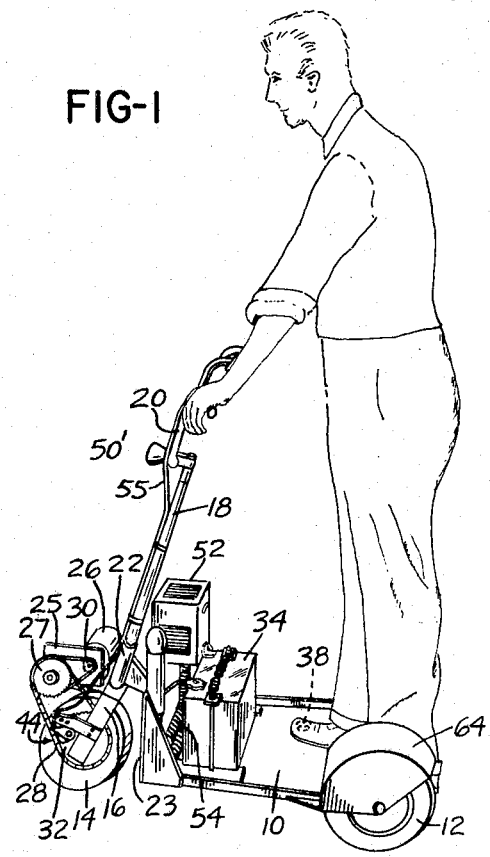
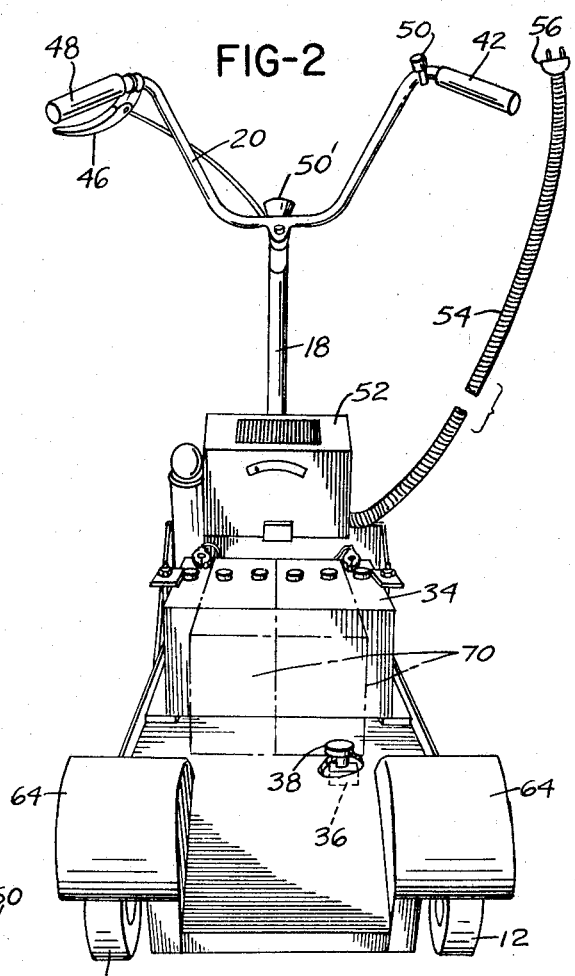
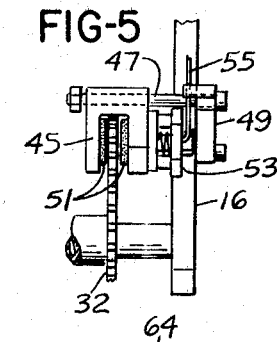
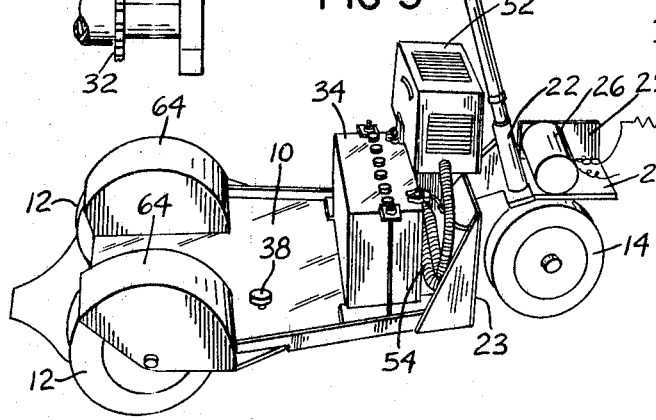
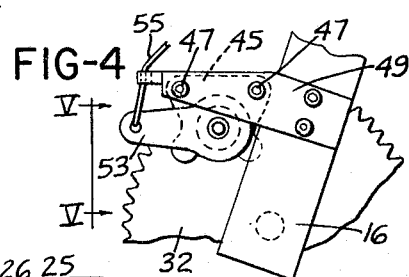
INVENTORS:
Ion V. K. Hott
Robert J. Haddix
BY

United States Patent Office 3,506,080
Patented Apr. 14, 1970

3,506,080
ELECTRICALLY OPERATED SCOOTER VEHICLE
Ion V. K. Hott and Robert J. Haddix, Dayton, Ohio, assignors to The Joyce-Cridland Company, Dayton, Ohio
Filed Dec. 21, 1967, Ser. No. 692,412
Int. Cl. B60k *1/00;* B62d *3/00*
U.S. Cl. 180—26
8 Claims

ABSTRACT OF THE DISCLOSURE

Scooter type vehicle having an electric drive motor and a battery to power the motor with a battery charger for charging the battery and also carried by the scooter.

---

This invention relates to a scooter type vehicle and is particularly concerned with such a vehicle which is driven by a battery powered electric motor.

While scooter type vehicles are generally known, we are not aware of any in which the scooter is driven by an electric motor which is powered by a battery carried by the scooter and wherein, further, a battery charging device is also carried by the scooter so that, merely by plugging a plug on the scooter into a conventional outlet, the battery can be charged.

Scooters of the nature referred to are useful, not only as pleasure vehicles, but also around industrial establishments to enable personnel to move about quickly and with little effort. An internal combustion engine powered scooter is generally satisfactory in a factory or warehouse or out of doors but in an office or like facility, an engine driven scooter is objectionable due to noise and fumes. The electrically operable scooter of the present invention is thus useful in any situation in which an engine driven scooter can be used and, in addition, has utility in situations wherein an engine driven scooter would be objected to or unsuitable.

The primary object of the present invention, therefore, is the provision of a scooter type vehicle which has no internal combustion drive engine and which thus has utility where an engine driven scooter is defective.

Another object of this invention is the provision of a powered scooter which is extremely quiet.

Still another object of this invention is the provision of a powered scooter whish does not produce fumes, such as engine exhaust gases.

A particular object of the invention is the provision of a battery powered scooter in which the battery can be charged while remaining in position on the scooter.

Still a further object is the provision of a scooter having a battery powered electric motor drive in which the motor and battery and controls are compactly and conveniently arranged on the scooter so as to leave the maximum cargo space.

The foregoing objects as well as other objects and advantages of the present invention will become more apparent upon reference to the following detailed specification, taken together with the accompanying drawings, in which:

FIGURE 1 is a perspective view of the scooter of the present invention as viewed from the side;

FIGURE 2 is a rear perspective view of the scooter;

FIGURE 3 is a perspective view looking in front the side opposite that from which FIGURE 1 is viewed;

FIGURE 4 is a fragmentary view showing a disc brake for the scooter; and

FIGURE 5 is a view looking at the disc brake as indicated by line V—V on FIGURE 4.

In the drawings, the scooter will be seen to comprise a platform 10 having a pair of laterally spaced rubber-tired rear wheels 12 and a single steerable front wheel 14.

Front wheel 14 is carried in a fork 16 at the bottom of column 18 which terminates at the upper end in handlebars 20. Column 18 is rotatably supported in bearing member 22 fixed to upstanding portion 23 at the front end of platform 10. Column 18 is in the middle of the platform and is inclined to dispose the handlebars 20 in the proper position while also positioning front wheel 14 in the most favorable manner for proper steering.

Column 18, or fork 16, carries a supporting base member 24 on which electric motor 26 is mounted. Base member 24 has an upstanding portion 25 on which compound idler sprocket 27 is mounted. Motor 26 is drivingly connected with front wheel 14 by drive means which may take the form of a chain 28 entrained about sprocket 30 on the motor shaft and about one part of sprocket 27. Another chain is entrained about the other part of sprocket 27 and sprocket 32 on wheel 14. The base member 24 and, therefore, motor 26, turns with column 18 and fork 16 as the vehicle is steered.

Mounted on the front end of platform 10 is a battery 34, a 12 volt battery, for example, which is connected in circuit with motor 26 for supplying electrical energy thereto.

Battery 34 is connected to motor 26 via a normally open switch 36 which is closed when button 38 on platform 10 is depressed. Button 38 may, furthermore, control a speed control rheostat (schematically shown at 40 in FIGURE 3) by variable depression of the button, or the rheostat may be controlled by a rotatable handgrip 42 on handlebar 20. In some instances no speed control is needed.

Front wheel 14 has a brake 44 which is operated by lever 46 adjacent handgrip 48 on handlebar 20.

Brake 44 comprises a two-legged frame member 45 which is slidably mounted on pins or bolts 47 fixed to a plate 49 that is, in turn, fixed to fork 16 for the front wheel. Frame member 48 has its legs disposed on opposite sides of sprocket 32 that is fixed to front wheel 14. There is, of course, clearance provided within the frame 45 for the passage therethrough of the chain that connects sprocket 32 with the pertaining part of compound idler sprocket 27.

Disposed within frame 45 is a pair of braking discs 51 disposed on opposite sides of sprocket 32 and adapted for being moved toward each other by actuation of a lever 53 so that the brake elements can be brought into frictional engagement with sprocket 32. Lever 53 is connected by the flexible cable means 55 with the aforementioned brake lever 46 on handle bars 20.

Since a battery is available, it is a simple matter to provide the scooter with an electric horn 50' controlled by button 50 adjacent handgrip 42.

Above and somewhat forwardly of battery 34 is a battery charger 52, preferably a rectifier bank or solid state automatic charger which permits plugging into the power supply for an indeterminate period without damage to the battery or charger. The charger has a long coiled cord 54 connected to the charger 52 at one end and having plug 56 on the other end. Cord 54 is stored in front of battery 34. To charge the battery, cord 54 is withdrawn from its storage place and plug 56 in plugged into a convenient receptacle, 115 v., for example, and the battery will be charged via charger 52.

For greater power, two batteries may be placed side by side as shown at 70 in FIGURE 2.

The vehicle rider, and any cargo, is well protected from the rear wheels by fenders 64 while the drive means for the front wheel is in a remote position on the front of column 18. The scooter is thus safe for all purposes.

The scooter of the present invention is quiet and fume free. It is inexpensive to build and operate. The operating components are grouped at the front of the scooter so as to leave a large cargo space for a rider and cargo. The motor forces and the braking forces are all contained within the supporting structure for the steerable front wheel which permits simplicity of design of the scooter. The scooter frame can, for example, be a simple weldment.

It will be understood that this invention is susceptible to modification in order to adapt it to different usages and conditions; and accordingly, it is desired to comprehend such modifications within this invention as may fall within the scope of the invention.

What is claimed is:

1. A scooter type vehicle having a cargo platform, and a pair of rear wheels and a steerable front wheel carried by the platform, said front wheel being supported on the lower end of a column rotatable on the front end of the platform and disposed in a vertical plane and having steering means at the upper end, said steering means being a handlebar on the upper end of said column, said front wheel having a brake, manual means on the handlebar for actuating said brake, an electric motor carried by said column and drivingly connected to said front wheel, a battery on said cargo platform, and switch means mounted on said platform and connecting said battery to said motor and foot-operable by an operator on said platform, said front wheel having a sprocket fixed thereto and said motor being connected to said sprocket by a drive chain, said brake comprising a frame floatingly supported on said column and having braking elements on opposite sides of said sprocket, and said manual means being operable for selectively moving said braking elements into frictional engagement with said sprocket for braking said vehicle.

2. A scooter type vehicle according to claim 1, which includes a battery charger on said platform for charging said battery.

3. A scooter type vehicle according to claim 2, in which said battery charger has a long coiled cord which is stored in front of said battery when not in use.

4. A scooter type vehicle according to claim 3, in which the cargo platform has an upstanding portion in front, said battery being mounted on said platform near said upstanding portion, said battery charger being supported above and somewhat in front of said battery, said upstanding portion of the cargo platform and said battery and said charger confining the space in which said cord is stored.

5. A scooter type vehicle according to claim 2, which includes an electrically operable signalling device, such as a horn, in circuit with the battery, and a control switch therefor on the said steering means.

6. A scooter type vehicle according to claim 1, in which a speed controlling rheostat is connected in circuit with said motor.

7. A scooter type vehicle according to claim 6, in which said steering means is a handlebar on the upper end of said column and manual means on said handlebar for adjusting said rheostat.

8. In a stand-up three-wheeled chariot type scooter, the combination of a platform, a battery mounted on said platform, a motor connected to the driving wheel having a sprocket fixed thereto, a switch for controlling the motor mounted on said platform and connected between the battery and motor, a braking device on the driving wheel and braking controls mounted on the handlebars for stopping and controlling said scooter.

References Cited

UNITED STATES PATENTS

| | | | |
|---|---|---|---|
| 1,832,018 | 11/1931 | Gossard | 180—65 X |
| 1,833,844 | 11/1931 | Lusse | 180—2 |
| 2,513,718 | 7/1950 | Gfrorer | 180—65 |
| 2,570,319 | 10/1951 | Cassady | 180—65 X |
| 2,612,968 | 10/1952 | Hood | 188—73 X |
| 3,062,329 | 11/1962 | Erickson | 188—24 |
| 3,219,137 | 11/1965 | Appleton | 180—26 |
| 3,224,524 | 12/1965 | Laher | 180—26 |
| 3,301,344 | 1/1967 | Mohs | 180—33 |

KENNETH H. BETTS, Primary Examiner

U.S. Cl. X.R.

180—65; 188—73